000

United States Patent
Dibiaso et al.

(10) Patent No.: US 7,499,696 B2
(45) Date of Patent: Mar. 3, 2009

(54) METHOD TO OPTIMIZE HIERARCHICAL MODULATION FOR A DIVERSITY SYSTEM

(75) Inventors: Eric A. Dibiaso, Kokomo, IN (US); Michael L. Hiatt, Jr., Westfield, IN (US); Glenn A. Walker, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 695 days.

(21) Appl. No.: 10/995,013

(22) Filed: Nov. 22, 2004

(65) Prior Publication Data

US 2005/0143004 A1 Jun. 30, 2005

Related U.S. Application Data

(60) Provisional application No. 60/525,616, filed on Nov. 26, 2003.

(51) Int. Cl.
   *H04B 7/185* (2006.01)
   *H04B 1/02* (2006.01)
   *H04B 7/02* (2006.01)
   *H04B 1/66* (2006.01)
   *H04B 1/04* (2006.01)
   *H03C 7/02* (2006.01)
   *H04L 27/00* (2006.01)
   *H04L 27/36* (2006.01)

(52) U.S. Cl. ............... 455/403; 455/12.1; 455/101; 455/102; 455/110; 375/295; 375/298; 375/299

(58) Field of Classification Search ............... 455/12.1, 455/13.1, 13.2, 13.3, 44, 61, 102, 106, 107, 455/108, 110, 404.1, 422.1, 426.1, 435.1, 455/452.1, 452.2, 517, 23, 101; 370/203, 370/204, 206, 210, 230, 232, 256, 321, 328, 370/329, 332, 336, 338, 342, 345, 349, 350, 370/352, 442; 375/130, 260, 261, 295, 296, 375/298, 299, 316, 326, 340, 347

See application file for complete search history.

(56) References Cited

U.S. PATENT DOCUMENTS 5,319,673 A * 6/1994 Briskman ............... 455/13.1

(Continued)

FOREIGN PATENT DOCUMENTS

| EP | 0594505 | 10/1993 |
|----|---------|---------|
| EP | 1 014 608 | 6/2000 |
| WO | 99/00957 | 1/1999 |
| WO | 00/28679 | 5/2000 |
| WO | 01/39456 | 5/2001 |
| WO | 2004/100479 | 11/2004 |

OTHER PUBLICATIONS

European Search Report dated Jun. 9, 2008.

(Continued)

*Primary Examiner*—Nay A Maung
*Assistant Examiner*—Paul P Tran
(74) *Attorney, Agent, or Firm*—Jimmy L. Funke

(57) ABSTRACT

The present invention involves a method for transmitting data having primary and secondary data. A first transmit signal is transmitted from a first communication satellite wherein the first transmit signal is produced when the transmitter modulates the primary and secondary data on a first carrier wave associated with the first communication satellite, with secondary data having a first polarity. A second transmit signal is transmitted from a second communication satellite wherein said second transmit signal is produced when the transmitter modulates the primary and secondary data on a second carrier wave associated with the second communication satellite with secondary data having a second polarity opposite the first polarity.

17 Claims, 8 Drawing Sheets

U.S. PATENT DOCUMENTS

| | | | |
|---|---|---|---|
| 5,454,009 A * | 9/1995 | Fruit et al. | 375/130 |
| 5,602,833 A * | 2/1997 | Zehavi | 370/209 |
| 5,646,935 A * | 7/1997 | Ishikawa et al. | 370/207 |
| 5,687,166 A | 11/1997 | Natali et al. | |
| 5,966,412 A | 10/1999 | Ramaswamy | |
| 6,119,827 A | 9/2000 | Militello et al. | |
| 6,349,205 B1 * | 2/2002 | Fang et al. | 455/419 |
| 6,510,317 B1 | 1/2003 | Marko et al. | |
| 6,570,533 B2 * | 5/2003 | Syrjarinne et al. | 342/357.12 |
| 6,570,858 B1 | 5/2003 | Emmons, Jr. et al. | |
| 6,678,336 B1 * | 1/2004 | Katoh et al. | 375/316 |
| 6,823,169 B2 * | 11/2004 | Marko et al. | 455/3.02 |
| 7,079,585 B1 * | 7/2006 | Settle et al. | 375/261 |
| 7,230,998 B2 * | 6/2007 | Walker et al. | 375/308 |
| 7,274,653 B1 * | 9/2007 | Settle et al. | 370/206 |
| 2005/0005120 A1 | 1/2005 | Kahn et al. | |
| 2006/0153315 A1 * | 7/2006 | Chen et al. | 375/295 |

OTHER PUBLICATIONS

Pursley, et al.; "Adaptive Nonuniform Phase-Shift-Key Modulation For Multimedia Traffic in Wireless Networks"; IEEE Journal on Selected Areas in Communications, vol. 18, No. 8, Aug. 2000; pp. 1394-1407.

Vitthaladevuni, et al.; Effect of Imperfect Phase and Timing Synchronization on the Error Rate Performance of PSK Modulations; IEEE Mar. 2002; pp. 356-360.

Hossain, et al.; Hierarchial Modulations for Multimedia and Multicast Transmission over Fading Channels; IEEE Mar. 2003; pp. 2633-2637.

Pursley, et al.; "Nonuniform Phase-Shift-Key Modulation for Multimedia Multicast Transmission in Mobile Wireless Networks"; IEEE Journal on Selected Areas in Communications, vol. 17, No. 5, May 1999, pp. 774-783.

Vitthaladevuni, et al.; "Exact BER Computation of Generalized Hierarchial PSK Constellations"; IEEE Feb. 2002, pp. 1974-1978.

J. Sesna; The DVB satellite, cable and SMATV systems; EBU Technical Review; Winter 1995; pp. 24-38.

Tanner; UBS Looks Southward, UBS, a Canadian Developer of MMDS Equipment, Has Its Eyes on the U.S.; Aug. 2001; www.shorecliffcommunications.com, Broadband Wireless Online, pp. 1-6.

Yoshida; New DVB satellite modulation scheme drops Turbo; Mar. 7, 2003; EETimesUK, www.electronicstimes.com; p. 1.

Schertz, Weck; Hierarchical modulation—the transmission of two independent DVB-T multiplexes on a single frequency; EBU Technical review; Apr. 2003; pp. 1-13.

* cited by examiner

METHOD TO OPTIMIZE HIERARCHICAL MODULATION FOR A DIVERSITY SYSTEM

This application claims the benefit of U.S. Provisional Patent Application No. 60/525,616 filed on Nov. 26, 2003.

TECHNICAL BACKGROUND

The present invention generally relates to the transmission of digital data, and more particularly, to the transmission of digital data in a satellite digital audio radio ("SDAR") system.

BACKGROUND OF THE INVENTION

In October of 1997, the Federal Communications Commission (FCC) granted two national satellite radio broadcast licenses. In doing so, the FCC allocated twenty-five (25) megahertz (MHz) of the electromagnetic spectrum for satellite digital broadcasting, twelve and one-half (12.5) MHz of which are owned by XM Satellite Radio, Inc. of Washington, D.C. (XM), and 12.5 MHz of which are owned by Sirius Satellite Radio, Inc. of New York City, N.Y. (Sirius). Both companies provide subscription-based digital audio that is transmitted from communication satellites, and the services provided by these and other SDAR companies are capable of being transmitted to both mobile and fixed receivers on the ground.

In the XM satellite system, two (2) communication satellites are present in a geostationary orbit—one satellite is positioned at longitude 115 degrees (west) and the other at longitude eighty-five (85) degrees (east). Accordingly, the satellites are always positioned above the same spot on the earth. In the Sirius satellite system, however, three (3) communication satellites are present that all travel on the same orbital path, spaced approximately eight (8) hours from each other. Consequently, two (2) of the three (3) satellites are "visible" to receivers in the United States at all times. Since both satellite systems have difficulty providing data to mobile receivers in urban canyons and other high population density areas with limited line-of-sight satellite coverage, both systems utilize terrestrial repeaters as gap fillers to receive and re-broadcast the same data that is transmitted in the respective satellite systems.

In order to improve satellite coverage reliability and performance, SDAR systems currently use three (3) techniques that represent different kinds of redundancy known as diversity. The techniques usually rely on some type of signal combining, which is typically performed prior to forward error correction decoding. Spatial, time and frequency diversity are techniques for improving reception performance. Spatial diversity refers to the use of two (2) satellites transmitting near-identical data from two (2) widely-spaced locations. Time diversity is implemented by introducing a time delay between otherwise identical data, and frequency diversity includes the transmission of data in different frequency bands. SDAR systems may utilize one (1), two (2) or all of the techniques.

As currently implemented, the technique used in the Sirius system uses a straight time delay between the two satellite signals to provide time diversity. The Sirius system performs a maximum ratio combining (MRC) algorithm prior to Viterbi decoding (a type of convolutional decoding). In general, this technique is analogous to adding the two signal vectors coherently to obtain the desired transmission.

As currently implemented in the XM system, a more complex complementary code is used for the convolutional decoding. A large interleaver also operates on each portion of the code to spread the information being broadcast over time. Thus, each satellite broadcasts a different portion of the complementary code. The receiver performs de-interleaving on each satellite and then performs a weighting prior to using the Viterbi decoding, providing a psuedo-MRC type behavior.

The limited allocation of twenty-five (25) megahertz (MHz) of the electromagnetic spectrum for satellite digital broadcasting has created a need in the art for an apparatus and method for increasing the amount of data that may be transmitted from the communication satellites to the receivers in SDAR systems.

SUMMARY OF THE INVENTION

The present invention provides a method of transmitting primary and secondary data over a satellite system, which has the secondary data imposed on the primary data with an opposite polarity on the two satellites, improving the performance of legacy receivers.

In one form of the invention, the method for transmitting data has both primary and secondary data. A first transmit signal is transmitted from a first communication satellite transmitting wherein the first transmit signal is produced when the transmitter modulates the primary and secondary data on a first carrier wave. The secondary data is imposed on the primary data and has a first polarity. A second transmit signal is transmitted from a second communication satellite wherein said second transmit signal is produced when the transmitter modulates the primary and secondary data on a second carrier wave. The secondary data which is imposed on the primary data has a second polarity opposite that of the first polarity. The two transmissions may have time, spatial, or frequency diversity.

In another form of the invention, the receiver has at least one antenna for receiving first and second transmit signals from satellite transmitters. A tuner unit tunes the first and second transmit signals received by the antenna, and at least one demodulator is coupled to the tuner unit. The demodulator is configured to demodulate the first and second transmit signals and detect the primary and secondary data as digital information.

BRIEF DESCRIPTION OF THE DRAWING

The above-mentioned and other features and objects of this invention, and the manner of attaining them, will become more apparent and the invention itself will be better understood by reference to the following description of embodiments of the invention taken in conjunction with the accompanying drawings, wherein.

Figure 1:
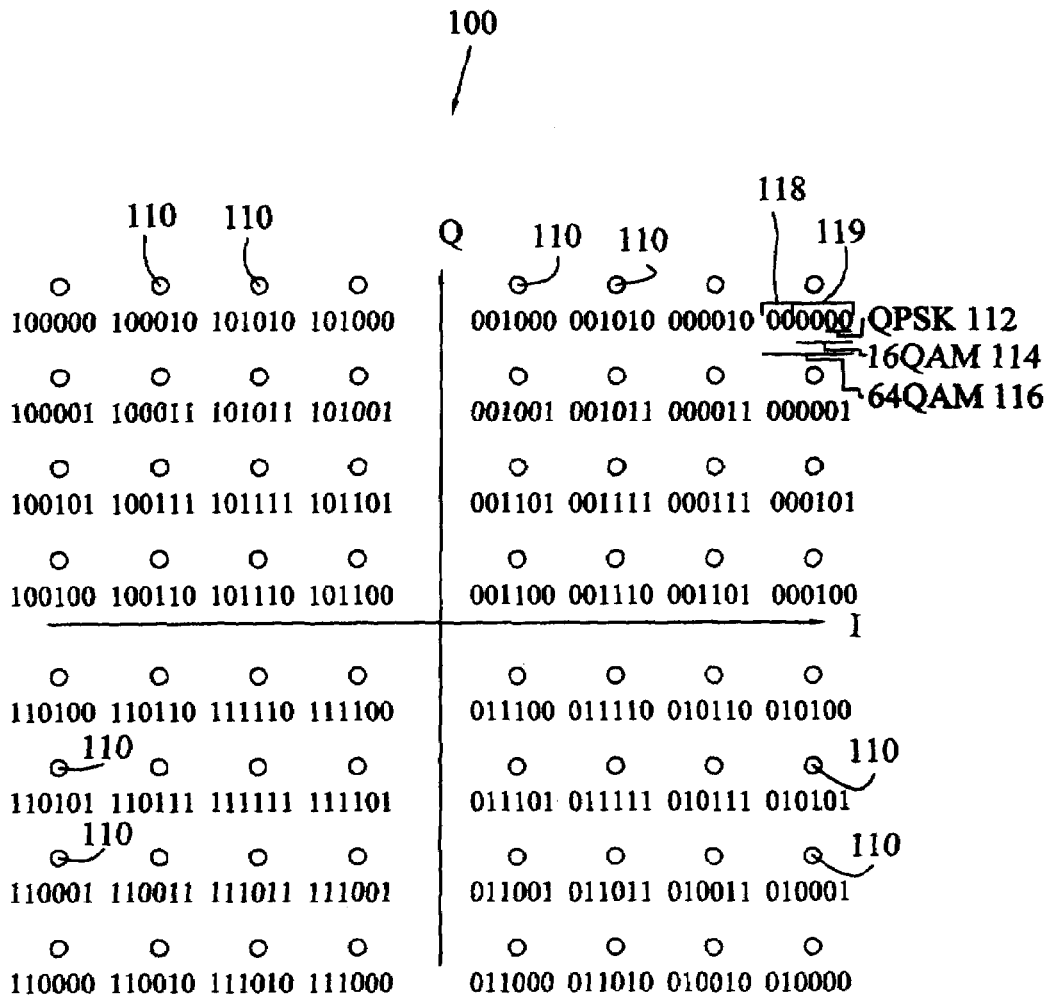
FIG. 1 is an illustrative view of a constellation chart for 64-quadrature amplitude modulation (QAM) with an embedded quadrature phase shift keying (QPSK) stream.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in several forms and such exemplification is not to be construed as limiting the scope of the invention in any manner.

DESCRIPTION OF INVENTION

The embodiments disclosed below are not intended to be exhaustive or limit the invention to the precise forms disclosed in the following detailed description. Rather, the embodiments are chosen and described so that others skilled in the art may utilize their teachings.

For the purposes of the present invention, certain terms shall be interpreted in accordance with the following definitions.

Baseband: A signal whose frequency content is in the vicinity of direct current (DC).

Carrier: A single frequency electromagnetic wave the modulations of which are used as communications signals.

Channel: A propagation medium for communication such as a path along which information in the form of an electrical signal passes (e.g., wire, air, water).

Data rate: The amount of data, or number of symbols, which may be transmitted on a signal per a unit of time.

Detector: A circuit that is capable of determining the content of a signal.

Downconvert: To convert a radio frequency signal from a higher to a lower frequency signal for processing (i.e., to baseband).

Downlink: To transmit data from a satellite to a receiver on earth.

Feed Forward Correction (FFC): A method of improving secondary data detection. By knowing the relative "I" (in-phase) and "Q" (quadrature) components of a constellation quadrant, the secondary detector may be enhanced to perform better by having a priori knowledge from the first detector to assist detection.

First Level Data and/or Primary Data: Existing data that may be interpreted by current (i.e., "legacy") SDAR receivers. Because the first level data can be interpreted by the legacy receivers, the first level data may also be considered to have backwards compatibility.

Hierarchical Modulation: A method in which two separate data or bit streams are modulated onto a single data stream by superimposing an additional data stream upon, mapped on, or embedded within the primary data transmission. The additional data stream may have a different data rate than the primary data stream. As such, the primary data is more susceptible to noise than it would be in a non-hierarchical modulation scheme. The usable data of the additional stream may be transmitted with a different level of error protection than the primary data stream. Broadcasters of SDAR services may use the additional and primary data streams to target different types of receivers, as will be explained below.

Legacy receiver: A current or existing SDAR receiver that is capable of interpreting first level data. Legacy receivers typically interpret second level data as noise.

Preamble: A known symbol or symbols in a transmission packet (typically used for synchronization).

Polarity: In regards to secondary data in hierarchical modulation, polarity refers to the quality or condition of the method in which secondary data is superimposed or embedded within the primary data transmission.

Quadrature: A method of coding information that groups data bits and transmits two separate signals on a carrier by summing the cosine and sine of the separate signals to produce a composite signal which may be later demodulated to recover both signals.

Second Generation Receiver: A SDAR receiver that contains hardware and/or software enabling the receiver to interpret second level data (e.g., demodulator enhancements). Second generation receivers may also interpret first level data.

Second Level Data, Secondary Data and/or Hierarchical Data: The additional data that is superimposed on the first level data to create a hierarchically modulated data stream. Second level data may be interpreted by SDAR receivers containing the appropriate hardware and/or software to enable such interpretation (i.e., "second generation" receivers). Second level, or secondary, data may perform differently from first level, or primary, data.

Signal: A detectable physical quantity or impulse by which information can be transmitted.

Symbol: A unit of data (byte, floating point number, spoken word, etc.) that is treated independently.

Unitary Signal: A signal on a single channel or path.

Upconvert: To convert from a lower frequency signal (i.e., baseband) to a higher radio frequency signal for broadcasting.

Uplink: A communications channel or facility on earth for transmission to a satellite, or the communications themselves.

Upmix: To combine multiple electrical signals to a radio frequency signal for broadcasting.

Waveform: A representation of the shape of a wave that indicates its characteristics (frequency and amplitude).

QAM is one form of multilevel amplitude and phase modulation that is often employed in digital data communication systems. Using a two-dimensional symbol modulation composed of a quadrature (orthogonal) combination of two (2) pulse amplitude modulated signals, a QAM system modulates a source signal into an output waveform with varying amplitude and phase. Data to be transmitted is mapped to a two-dimensional, four-quadrant signal space, or constellation. The QAM constellation employs "I" and "Q" components to signify the in-phase and quadrature components, respectively. The constellation also has a plurality of phasor points, each of which represent a possible data transmission level. Each phasor point is commonly called a "symbol," represents both I and Q components and defines a unique binary code. An increase in the number of phasor points within the QAM constellation permits a QAM signal to carry more information.

Many existing systems utilize QPSK modulation systems. In such QPSK systems, a synchronous data stream is modulated onto a carrier frequency before transmission over the satellite channel, and the carrier can have four (4) phase states, e.g., 45 degrees, 135 degrees, 225 degrees or 315 degrees. Thus, similar to QAM, QPSK employs quadrature modulation where the phasor points can be uniquely described using the I and Q axes. In contrast to QAM, however, the pair of coordinate axes in QPSK can be associated with a pair of quadrature carriers with a constant amplitude, thereby creating a four (4) level constellation, i.e., four (4) phasor points having a phase rotation of 90 degrees. Differential quadrature phase shift keying (D-QPSK) refers to the procedure of generating the transmitted QPSK symbol by calculating the phase difference of the current and the preceding QPSK symbol. Therefore, a non-coherent detector can be used for D-QPSK because it does not require a reference in phase with the received carrier.

Hierarchical modulation, used in DVB-T systems as an alternative to conventional QPSK, 16-QAM and 64-QAM modulation methods, may better be explained with reference to FIG. 1. FIG. 1 illustrates 64-QAM constellation 100. Each permissible digital state is represented by phasors 110 in the I/Q plane. Since eight (8) by eight (8) different states are defined, sixty-four (64) possible values of six (6) bits may be transmitted in 64-QAM constellation 100. FIG. 1 shows the assignment of binary data values to the permissible states. In a 16-QAM constellation, there are four (4) by four (4) different states and four (4) transmitted bits, in a 4-PSK constellation, there are two (2) by two (2) states and two (2) transmitted bits, and in a BPSK constellation, there is one (1) state and one (1) transmitted bit.

In systems employing hierarchical modulation schemes, the possible states are interpreted differently than in systems using conventional modulation techniques (e.g., QPSK, 16-QAM and 64-QAM). By treating the location of a state within its quadrant and the number of the quadrant in which the state is located as a priori information, two separate data streams may be transmitted over a single transmission channel. While 64-QAM constellation 100 is still being utilized to map the data to be transmitted, it may be interpreted as the combination of a 16-QAM and a 4-PSK modulation. FIG. 1 shows how 64-QAM constellation 100, upon which is mapped data transmitted at six (6) bits/symbol 116, may be interpreted as including QPSK constellation 112 (which includes mapped data transmitted at two (2) bits/symbol) combined with 16-QAM constellation 114 (which includes mapped data transmitted at four (4) bits/symbol). The combined bit rates of QPSK and the 16-QAM data steams is equal to the bit rate of the 64-QAM data stream.

In systems employing hierarchical modulation schemes, one (1) data stream is used as a secondary data stream while the other is used as a primary data stream. The secondary data stream typically has a lower data rate than the primary stream. Again referring to FIG. 1, using this hierarchical modulation scheme, the two (2) most significant bits 118 may be used to transmit the secondary data to second generation receivers while the remaining four (4) bits 119 may be used to code the primary data for transmission to the legacy receivers.

Figure 2:
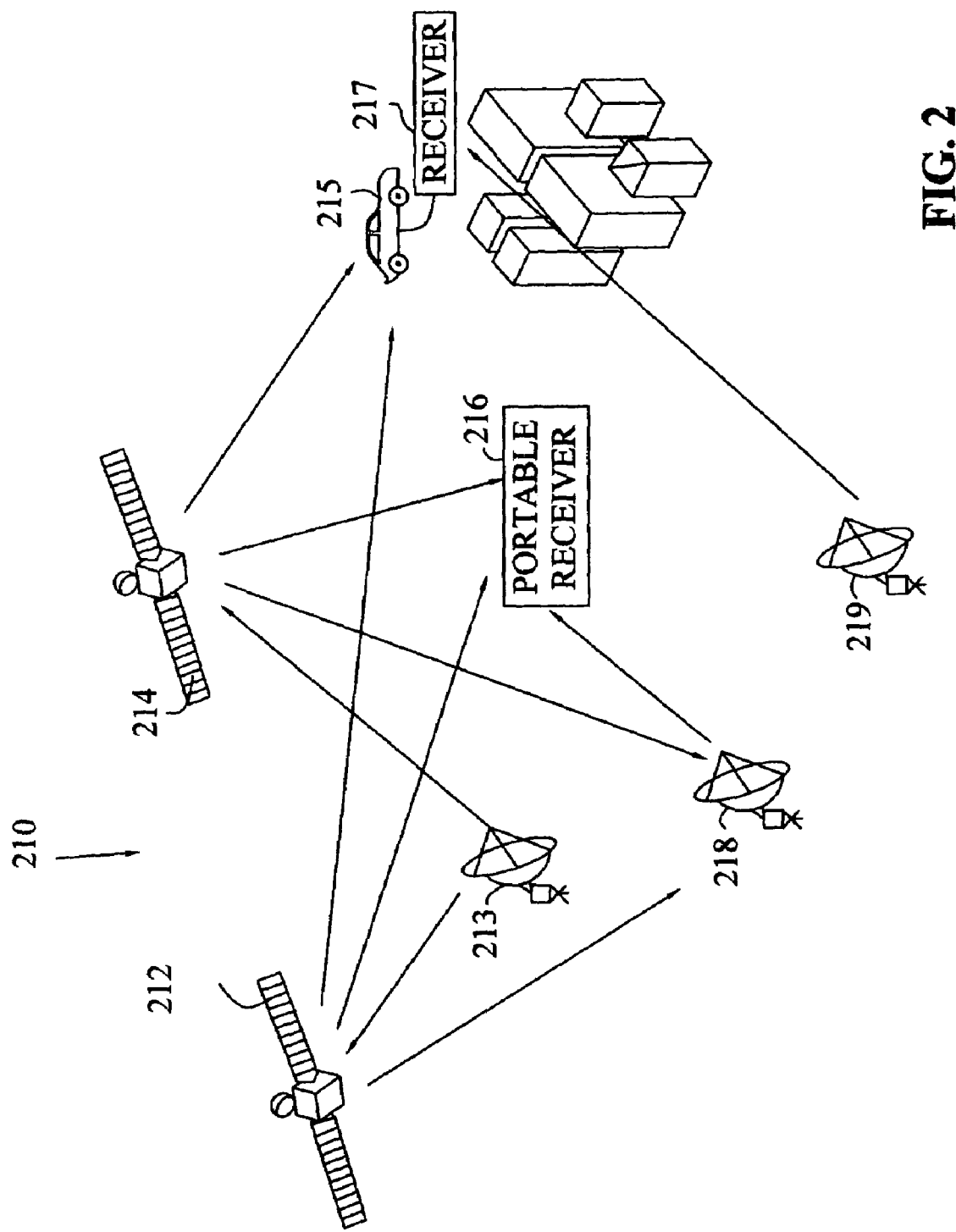
FIG. 2 is a diagrammatic view of a SDAR system implementing a method of the present invention.

The present invention contemplates the use of hierarchical modulation in a SDAR system, while maintaining backward compatibility for legacy receivers. Shown in FIG. 2 is a diagrammatic view of a SDAR system in which a hierarchical modulation scheme is employed. SDAR system 210 includes first and second communication satellites 212, 214, which transmit line-of-sight signals to SDAR receivers 216, 217 located on the earth's surface. A third satellite may be included in other SDAR systems. Satellites 212, 214, as indicated above, may provide for spatial, frequency and time diversity. As shown, receiver 216 is a portable receiver such as a handheld radio or wireless device. Receiver 217 is a mobile receiver for use in vehicle 215. SDAR receivers 216, 217 may also be stationary receivers for use in a home, office or other non-mobile environment.

SDAR system 210 further includes a plurality of terrestrial repeaters 218, 219. Terrestrial repeaters 218, 219 receive and retransmit the satellite signals to facilitate reliable reception in geographic areas where the satellite signals are obscured from the view of receivers 216, 217 by obstructions such as buildings, mountains, canyons, hills, tunnels, etc. The signals transmitted by satellites 212, 214 and terrestrial repeaters 218, 219 are received by receivers 216, 217, which either combine or select one of the signals as receiver's 216, 217 output.

Figure 3:
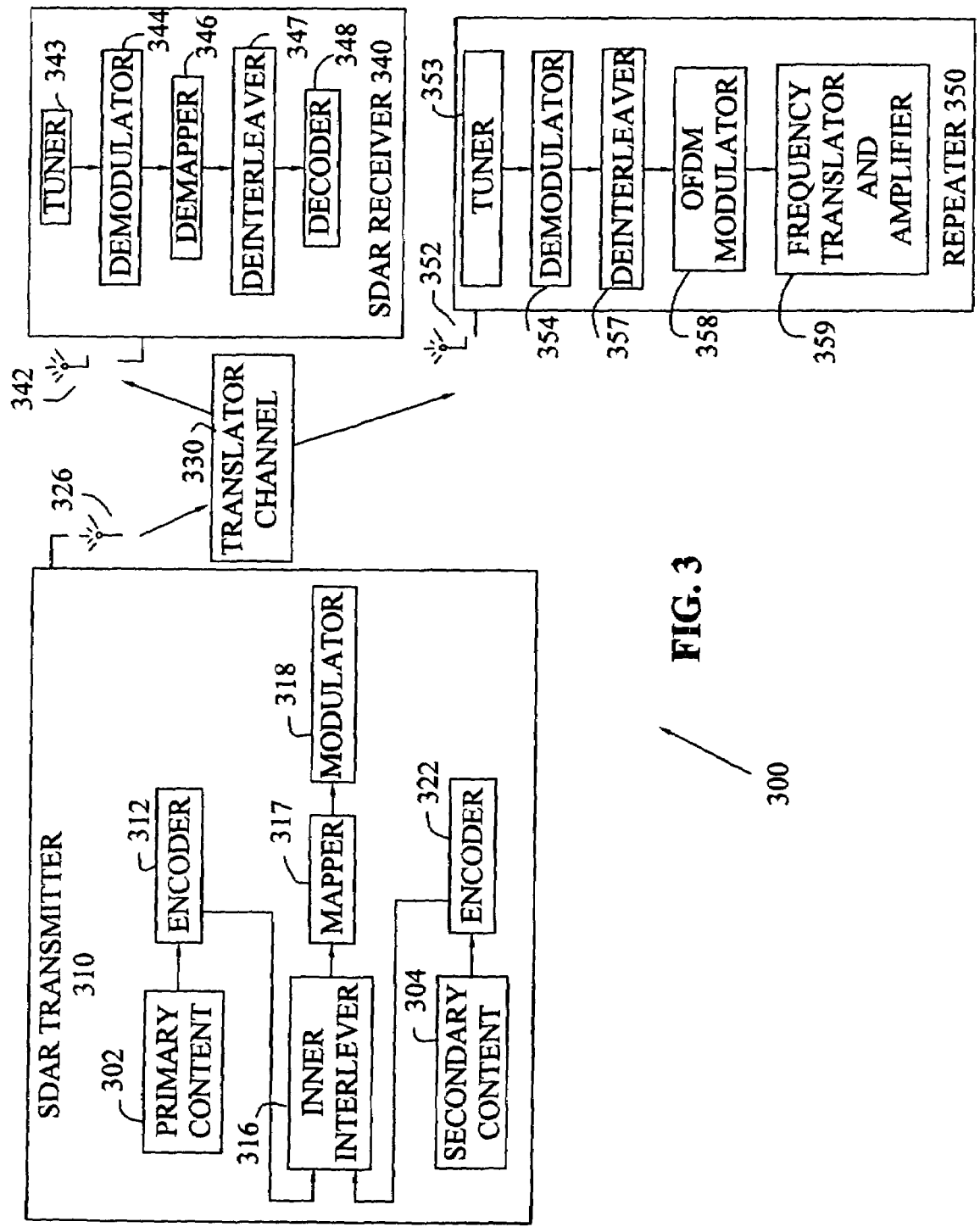
FIG. 3 is a block diagram of a SDAR communication system adapted to enable a method of the present invention.

FIG. 3 illustrates a block diagram of a SDAR communication system in which hierarchical modulation is utilized. In an exemplary embodiment of the present invention, SDAR communication system 300 includes SDAR transmitter 310, SDAR receiver 340 and terrestrial repeater 350. As in conventional SDAR communication systems, SDAR communication system 300 will input data content 302, 304 and perform processing and frequency translation within transmitter 310. The digital data is transmitted over transmission channel 330 to receiver 340 or terrestrial repeater 350. Generally, receiver 340 performs the converse operations of transmitter 310 to recover data 302, 304. Repeater 350 generally retransmits data 302, 304 to receiver 340. Unlike conventional SDAR communication systems, however, transmitter 310, receiver 340 and repeater 350 of the present invention provide hardware enabling SDAR communication system 300 to utilize a hierarchical modulation scheme to transmit and receive more digital data than conventional systems.

SDAR transmitter 310 includes encoders 312, 322. The audio, video, or other form of digital content to be transmitted comprises primary input signal 302 and secondary input signal 304, which are typically arranged as series of k-bit symbols. Primary input signal 302 contains primary, or first level, data and secondary input signal 304 contains secondary, or second level, data. Encoders 312, 322 encode the k bits of each symbol as well as blocks of the k-bit symbols. In other embodiments of the present invention, separate encoders may be used to encode the blocks of k-bit symbols, for example, outer and inner encoders. In an exemplary embodiment of the present invention, encoder 312 may encode primary data stream 302 using a block or a convolutional forward error correction (FEC) algorithm, and encoder 322 may encode secondary data stream 304 using a turbo coding algorithm or a low density parity check FEC algorithm. It is contemplated that other FEC encoding methods may be utilized to encode primary and secondary data streams 302, 204, including, for example, Hamming codes, cyclic codes and Reed-Solomon (RS) codes.

Figure 6:
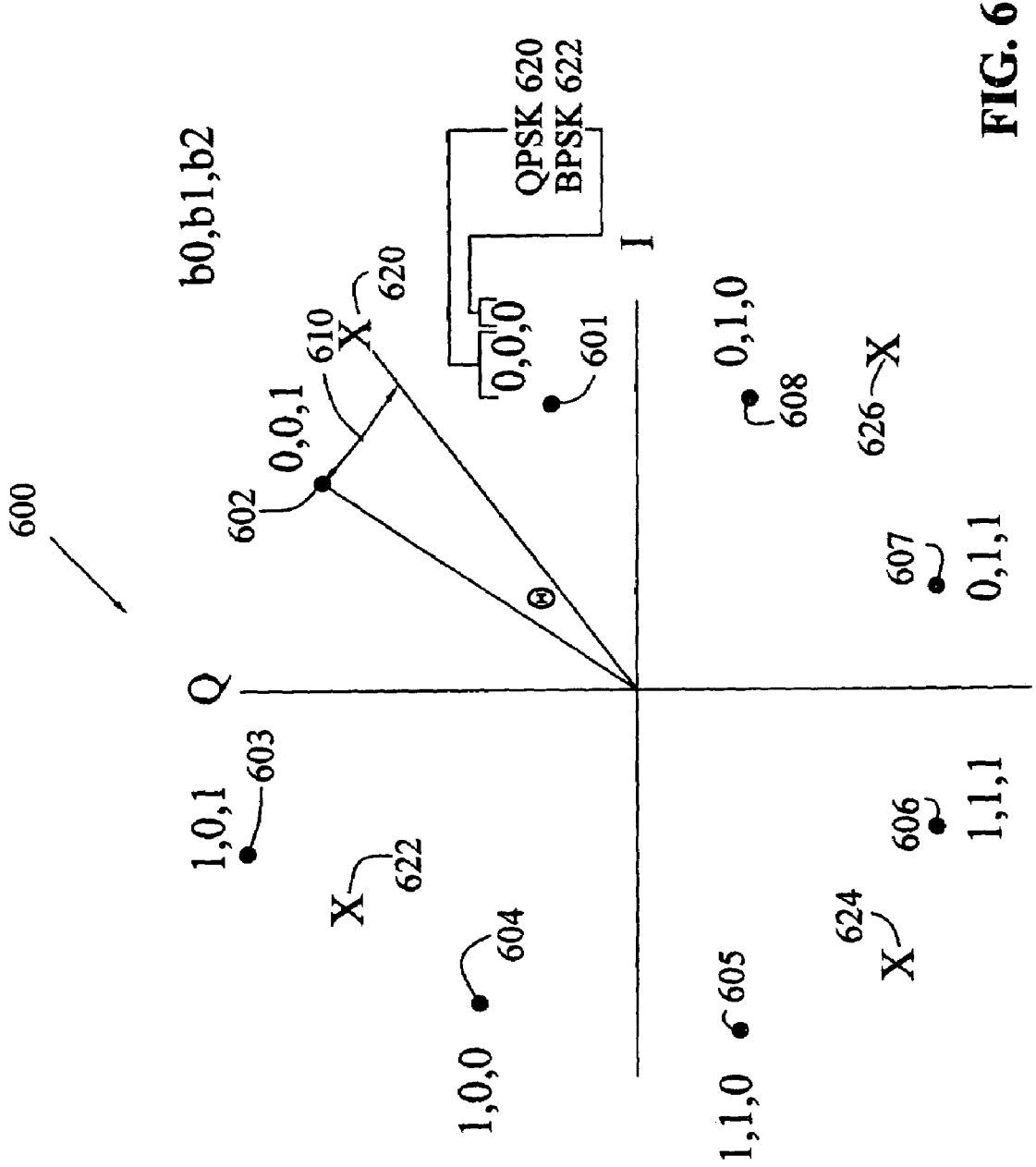
FIG. 6 is a diagrammatic view of a hierarchical 8-PSK constellation.

Again referring to FIG. 3, inner interleaver 316 multiplexes encoded secondary content data stream 304 with encoded primary content data stream 302 to form a transmit data stream. This transmit data stream is passed to mapper 317, which maps the data stream into symbols composed of I and Q signals. Mapper 317 may be implemented as a look-up table where sets of bits from the transmit signal are translated into I and Q components representing constellation points or symbols. FIG. 6 is representative of an exemplary embodiment of the present invention, in which a hierarchical modulation scheme is employed and the constellation points are in accordance with either a uniform or non-uniform 8-PSK constellation 600, where each phasor is represented by a three (3) bit symbol composed of I and Q signals.

Figure 4:
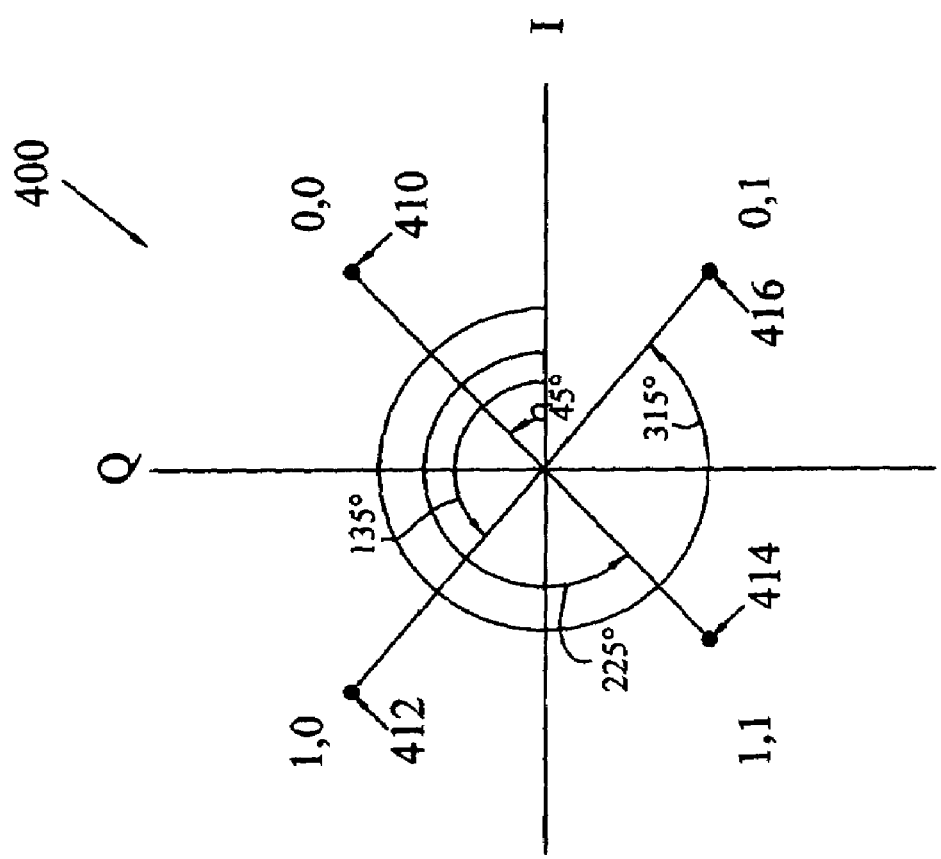
FIG. 4 is a diagrammatic view of a QPSK constellation.
Figure 5:
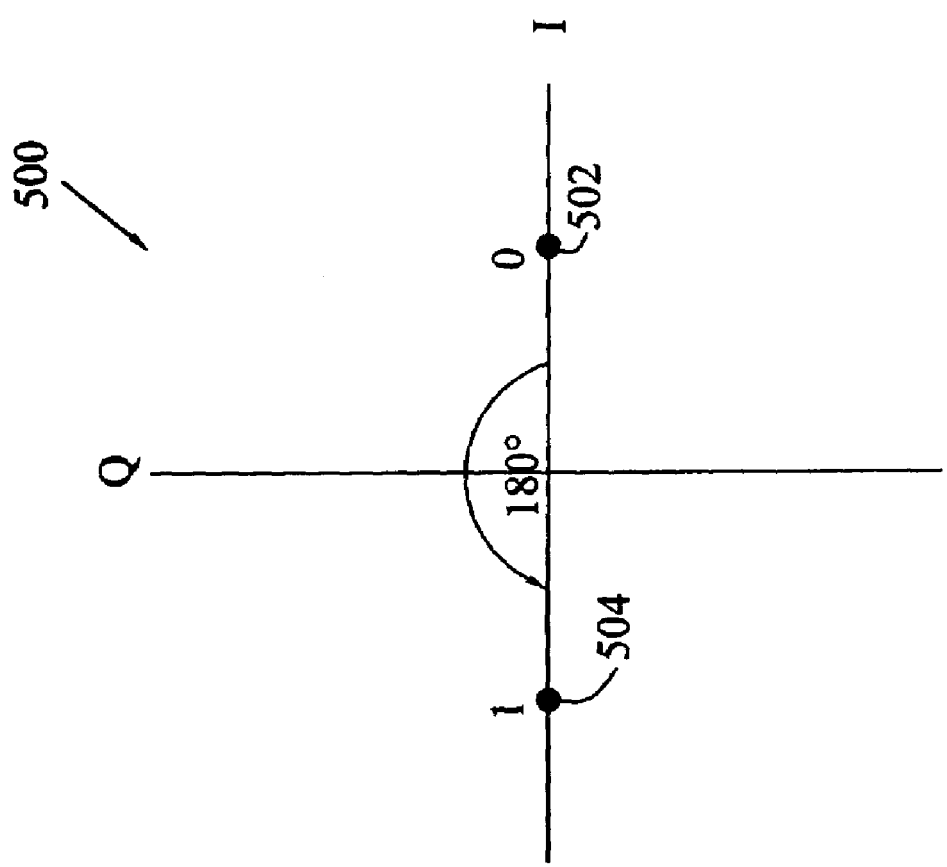
FIG. 5 is a diagrammatic view of a binary phase shift keying (BPSK) constellation.

FIG. 4 shows QPSK constellation 400 for primary data having two (2) transmitted bits/symbol. Phasors "00", "10", "11", "01" correlate to a phase of 45 degrees, a phase of 135 degrees, a phase of 225 degrees and a phase of 315 degrees, respectively. FIG. 5 shows BPSK constellation 500 for secondary data having one (1) transmitted bit/symbol. Phasors "0" and "1" correlate to a phase of zero (0) and 180 degrees, respectively. When a secondary data symbol is added onto a primary data symbol, constellation 600 of FIG. 6 is illustrative of the resulting hierarchical modulation.

Constellation 600 may be perceived as two (2) sets of superimposed modulations—QPSK constellation 400 transmitting two (2) bits/symbol 620 combined with BPSK constellation 500 comprising one (1) bit/symbol. The first modulation is the primary QPSK data, which is represented by "x" marks 620, 622, 624, 626. In order to superimpose the secondary data onto the primary data, the primary QPSK data is phase offset by the additional, secondary data, which is represented by any of data points 601, 602, 603, 604, 605, 606, 607, 608 depending on the phase offset. Positive phase offsets include phasors 602, 604, 606 and 608, and negative phase offsets include 601, 603, 605 and 607.

Shown in FIG. 6, phase offset 610 is the offset angle relative to the QPSK symbol. As explained above, a typical QPSK constellation contains 45 degree, 135 degree, 225 degree and 315 degree points. The hierarchical data is represented by a phase offset relative to those four (4) degree points, and the phase offsets with the four (4) degree points represent a hierarchical (8-PSK) constellation. A uniform 8-PSK constellation is created when offset angle 610 is 22.5 degrees. Every other offset angle 610 creates a non-uniform 8-PSK constellation. For example, as shown in FIG. 6, a 15 degree phase offset relative to primary data phasors 620, 622, 624, 626 produces a phase offset correlative to phasors 601 ("000") or 602 ("001"), 603 ("101") or 604 ("100"), 605 ("110") or 606 ("111"), and 607 ("011") or 608 ("010"), respectively. Gray coding is a method which may be used to make the bit assignments for the hierarchical constellation. For example, reference is made to the secondary data bit (b2). Instead of making b2=0 a negative offset and b2=1 a positive outset, the hierarchical constellation may be configured so as to increase the bit error rate (BER) performance (e.g., b2=1 can be made a negative offset).

The amount of the phase offset is equal to the amount of power in the secondary signal. The amount of energy in the secondary signal may not be equal to the amount of energy in the primary signal. As phase offset 610 is increased, the energy in the secondary data signal is also increased. The performance degradation to the primary data signal is minimized by the perceived coding gain improvement as phase offset 610 is increased. The application of the hierarchical phase modulation on top of an existing QPSK signal containing primary data causes phase offset 610 to adjust either positively or negatively relative to the hierarchical data.

In general, a secondary data bit causes either a larger Q magnitude and smaller I magnitude or a larger I magnitude and smaller Q magnitude. With FEC techniques utilized in encoders 312, 322, the I and Q signals are used in conjunction with each other over a block of data. These techniques give the appearance that the primary data bits are spread over time, enabling the secondary data to appear somewhat orthogonal to the primary data bits. Indeed, it has been shown in simulations that the secondary data's impact on the primary data is somewhat orthogonal. For example, for a twenty (20) degree phase offset for secondary data, the primary data has a one (1) decibel (dB) degradation when using a rate 1/3 convolutional code with a constraint length of seven (7), followed by a (255, 223) RS block code (8 bits/symbol). However, when the primary data has no FEC coding, the impact of the twenty (20) degree phase offset is 4.1 dB. This data demonstrates a perceived coding improvement of 3.1 dB in the case where phase offset 610 is set to twenty (20) degrees.

Again referring to FIG. 3, the FEC coding technique implemented by encoders 312, 322 spreads the primary and secondary data over many QPSK symbols, which essentially spreads the energy over time and the I and Q bits. To overcome the unequal signal-to-noise ratio ("Eb/No") between primary data bits and secondary data bits, the amount of phase offset 610 may be increased until the performance of the primary data is equal to the performance of the secondary data. However, as phase offset 610 is increased, legacy receivers may have a difficult time acquiring and tracking the desired primary data signal. By spreading the second level bits over multiple symbols, spread spectrum coding techniques may be used to increase the amount of energy in the secondary bits. This allows phase offset 610 to be adjusted and made more compatible with legacy receivers. Additionally, the use of second level data spreading reduces overall second level data throughput. Overall, several techniques may be utilized to maximize the performance of the secondary data. These techniques include: increasing phase offset 610 to maximize the secondary data energy per symbol; using multiple symbols per secondary data bit; using more complex FEC algorithms, and using a beam steering antenna to improve the performance of the secondary data (e.g., a higher gain directional antenna for stationary reception and a pointing/steering antenna for mobile reception).

Referring back to FIG. 3, after mapper 317 translates encoded and interleaved primary and secondary data streams 302, 304, respectively, into I and Q components, the I and Q components are modulated by modulator 318. Modulation enables both primary data stream 302 and secondary data stream 304 to be transmitted as a single transmission signal via antenna 326 over single transmission channel 330. Primary data stream 302 is modulated with secondary data stream 304 using one of a number of modulation techniques, including amplitude or phase and may include differential (e.g., BPSQ, QPSK, differential Q-PSK, or pi/4 differential QPSK) or coherent modulation. According to the technique that modulator 318 employs, modulator 318 may be any of a amplitude or phase modulator. Each modulation technique is a different way of transmitting the data across channel 330. The data bits are grouped into pairs, and each pair is represented by a symbol, which is then transmitted across channel 330 after the carrier is modulated.

An increase in the capacity of the transmitted signal would not cause backwards compatibility problems with legacy receivers as long as the legacy receivers may interpret the first level data. Second generation receivers, however, are capable of interpreting both first and second level data. Techniques may be employed to minimize the degradation in the legacy receiver, including decreasing phase offset 610 to limit the amount of the second level data energy per symbol, limiting the amount of time over which the second level data is transmitted, and making the second level data energy appear as phase noise to the legacy receiver.

Referring back to FIG. 2, after modulator 318 modulates first data stream 302 and second level data stream 304 (FIG. 3) to create a transmission signal, transmitter 213 uplinks the transmission signal to communication satellites 212, 214. Satellites 212, 214, having a "bent pipe" design, receive the transmitted hierarchically modulated signal, performs frequency translation on the signal, and re-transmits, or broadcasts, the signal to either one or more of plurality of terrestrial repeaters 218, 219, receivers 216, 217, or both.

As shown in FIG. 3, terrestrial repeater 350 includes terrestrial receiving antenna 352, tuner 353, demodulator 354, de-interleaver 357, modulator 358 and frequency translator and amplifier 359. Demodulator 354 is capable of down-converting the hierarchically modulated downlinked signal to a time-division multiplexed bit stream, and de-interleaver 357 re-encodes the bit-stream in an orthogonal frequency division multiplexing (OFDM) format for terrestrial transmission. OFDM modulation divides the bit stream between a large number of adjacent subcarriers, each of which is modulated with a portion of the bit stream using one of the M-PSK, differential M-PSK (D-MPSK) or differential pi/4 M-PSK (pi/4 D-MPSK) modulation techniques. Accordingly, if a hierarchically modulated signal is transmitted to one or both terrestrial repeaters 218, 219 (FIG. 2), terrestrial repeaters 218, 219 receive the signal, decode the signal, re-encode the signal using OFDM modulation and transmit the signal to one or more receivers 216, 217. Because the signal contains both the first and second level data, the terrestrial signal maintains second level data bit spreading over multiple symbols.

Also shown in FIG. 3, SDAR receiver 340 contains hardware (e.g., a chipset) and/or software to process any received hierarchically modulated signals as well. Receiver 340 includes one or more antennas 342 for receiving signals transmitted from either communication satellites 212, 214, terrestrial repeaters 218, 219, or both (FIG. 2). Receiver 340 also includes tuner 343 to translate the received signals to baseband. Separate tuners may be used to downmix the signals received from communication satellites 212, 214 and the signals received from terrestrial repeaters 218, 219. It is also envisioned that one tuner may be used to downmix both the signals transmitted from communication satellites 212, 214 and the signals transmitted from repeaters 218, 219.

Once the received signal is translated to baseband, the signal is demodulated by demodulator 344 to produce the I and Q components. De-mapper 346 translates the I and Q components into encoded primary and secondary data streams. These encoded bit streams, which were interleaved by interleaver 316, are recovered by de-interleaver 347 and passed to decoder 348. Decoder 348 employs known bit and block decoding methods to decode the primary and secondary bit streams to produce the original input signals containing the primary and secondary data 302, 304. In other embodiments of the present invention, multiple decoders may be used, e.g., outer and inner decoders. Receiver 340 may also use a feed forward correction technique to improve its detection of the secondary data. By knowing the relative I/Q quadrant, receiver 340 may be enhanced to perform better by having such a priori knowledge, which assists in the detection of the transmitted signal. For example, referring to FIG. 6, if it is known from a priori first level data knowledge that symbol 602 or 601 was transmitted at some point in time, and the received symbol lands at 604, it can be inferred by minimum distance that the received second level data bit is a weak one (1) by utilizing feed forward correction. However, without feed forward correction the second level data bit would have been detected as a strong zero (0). Therefore, feed forward detection utilizes the decoded symbol with the detected offset (either positive or negative) to determine the secondary data bit.

Figure 7:
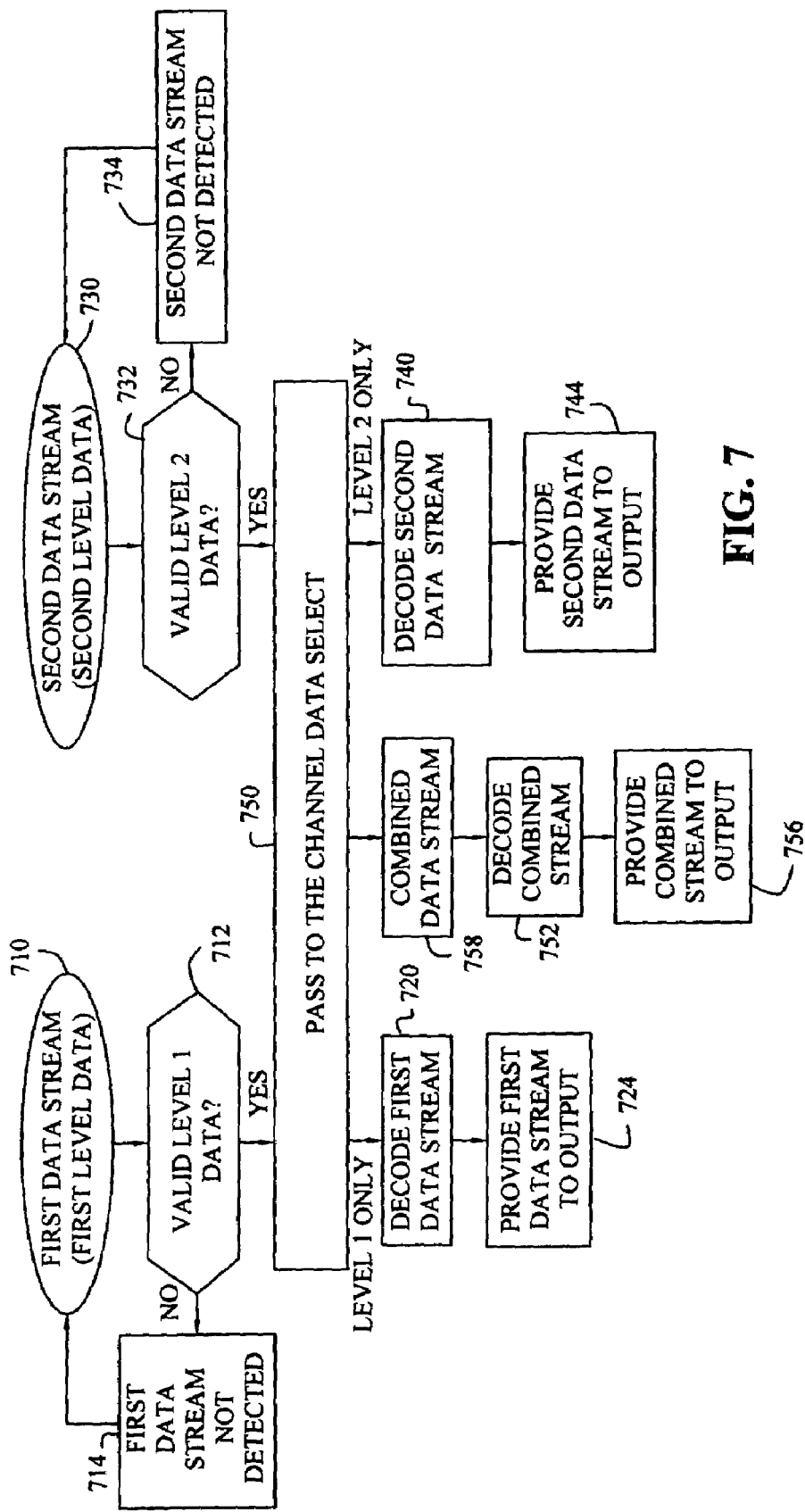
FIG. 7 is a flow chart illustrating a method of the present invention as utilized in a SDAR receiver.

In another embodiment of the present invention, a method of enabling extra data bits from a hierarchical modulation scheme to be used to transmit additional data for each channel in a SDAR system is contemplated. A flow chart illustrating this embodiment of the present invention as utilized in an SDAR communication system is shown in FIG. 7. It is contemplated that the inventive method would be carried out by a receiver adapted to be used in a SDAR system. The receiver may concurrently process the receipt of first data stream 710 and second data stream 730. If first data stream 710 is valid as determined by error checking at step 712, first data stream 710 is passed to a channel data select at step 750. If first data stream 710 is selected and second data stream 730 is either independent or not valid, only first data stream 710 is decoded at step 720 at its original rate, e.g., forty-eight (48) kbps. The decoded data from first data stream 710 is then passed to an output unit at step 724.

If second data stream 730 is valid as determined by error checking at step 732, then second data stream 730 is passed to the channel data select at step 750. If second data stream 730 is selected and is independent from first data stream 710, only second data stream 730 is decoded at step 740 at its original rate, e.g., sixteen (16) kbps. The decoded data from second data stream 730 is then passed to an output unit at step 744.

If the receiver determines at step 712 that first data stream 710 is valid and at step 732 that second data stream 730 is valid, both data streams are passed to the channel data select at step 750. The channel data select determines if second data stream 730 is an enhancement to first data stream 710. Audio enhancements may include audio quality enhancements, audio coding enhancements such as 5.1 audio (i.e., a Dolby® AC-3 digital audio coding technology in which 5.1 audio channels [left, center, right, left surround, right surround and a limited-bandwidth subwoofer channel] are encoded on a bit-rate reduced data stream), data/text additions, album pictures, etc. If second data stream 730 is an enhancement to first data stream 710, the channel data select combines the two (2) data streams such that the combined signal has a data rate greater than the first data stream's 710 data rate, e.g., 64 kbps. Thus, the sixteen (16) kbps data rate of second data stream 730 acts to increase the rate of first data stream 710 from forty-eight (48) kbps to sixty-four (64) kbps. Combined data stream 758 is then decoded at step 752 and passed to an output unit at step 756. In an exemplary embodiment, when switching from first data stream 710 to combined data stream 758, the increase in data rate is blended so as not to enable a quick change between first data stream 710 and combined data stream 758. If second data stream 730 is determined to be invalid, the channel data select switches to a "first data level" only implementation and sends first data stream 710 to be decoded at step 720. The data rate of first data stream 710 remains at its original forty-eight (48) kbps. In an exemplary embodiment of this inventive method, a decrease in data rate is blended so as not to enable a quick change between first data stream 710 and combined data stream 758. Assuming that second data stream 730 becomes or remains valid, the receiver decodes combined data stream 758 at step 752 and provides combined data stream 758 to an output unit at step 756.

In accordance with the present invention, improved performance of legacy receivers may be obtained when two satellites are used to broadcast the primary and secondary data. In this embodiment, one of the satellites uses a positive polarity imposition of the secondary data upon the primary data. The second transmitter uses a negative polarity imposition of the secondary data upon the primary data. The imposition of the secondary data upon the primary data may be through a phase shift offset, an amplitude modulation offset, or other suitable methods of combining two sets of data.

Figure 8:
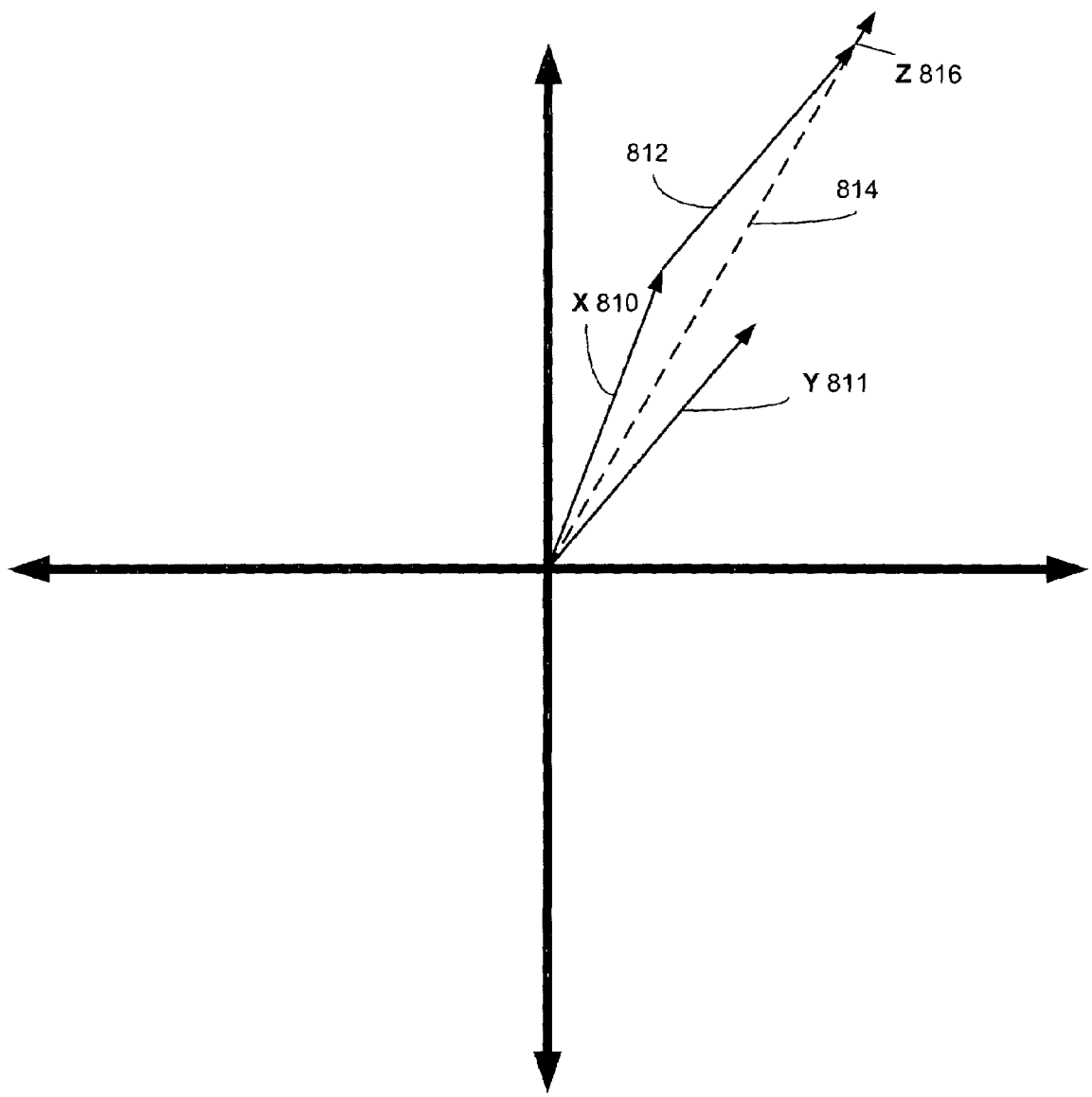
FIG. 8 is a diagrammatic view of a hierarchical 8-PSK constellation using the methodology of the present invention.

One example of such a quadrature signal is provided in FIG. 8. In this example, first signal vector X 810 and second signal vector Y 811 are transmitted from two separate sources and received with identical signal power. Through the use of vector addition, the second signal vector Y 811, is repositioned to vector 812 and added to the first signal vector X 810. The resultant of this addition, vector 814, results in the output signal Z 816. For legacy receivers designed to receive and combine two satellite signals, the only perceived signal is Z 816, which has an exact phase correspondence along vector 814 with a conventional signal containing only primary data. For second generation receivers, each signal vector X 810 and Y 811 may be separately detected and the secondary data appropriately recognized. A Second Generation Receiver may use different forward error correction techniques on the primary and secondary data in the transmission to optimize reception and/or increase the system capacity. A terrestrial repeater may receive one or both of the satellite transmissions and re-broadcast the first and second signals with the original diversity.

In numerical terms, assuming the example of FIG. 8 provided primary data at forty-five degrees (45°) secondary data with a phase shift of twenty degrees (20°), then the vector for signal X is sixty-five degrees (65°) and that of signal Y is 25 degrees (25°). Combined signal Z then has a magnitude of 0.9397 of a phase shifted modulated signal containing only primary data. Assuming that a single satellite is degraded by 1 decibel (dB), then the degradation of a hierarchical signal with secondary data having identical polarities is still 1 dB. However, when the hierarchical signal has secondary data with opposite polarities then the degradation of the combined signal is only 0.27 dB, providing a gain of 0.73 dB when two satellites are broadcasting with equal power.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

We claim:

1. A method for transmitting data having both primary and secondary data, said method comprising the steps of:

transmitting a first transmit signal in satellite based transmission to legacy and second generation receivers, wherein said first transmit signal is produced when the transmitter hierarchically modulates the secondary data on selected symbols of the primary data to provide first modified primary data and modulates the first modified primary data on a first carrier wave, wherein each of the selected symbols of the primary data is modified in a predetermined manner and in one of two opposing directions based on the value of the secondary data recoverably applied with a first polarity; and transmitting a second transmit signal in satellite based transmission wherein said second transmit signal is produced when the transmitter hierarchically modulates the secondary data on the selected symbols of the primary data to provide second modified primary data and modulates the second modified primary data on a second carrier wave, wherein each of the selected symbols of the primary data is modified in the predetermined manner and in the other of the two opposing directions based on the value of the secondary data recoverably applied with a second polarity opposite the first polarity, whereby the modification of each selected symbol of the primary data in the first transmit signal based on the secondary data is opposite in direction to the modification of the corresponding symbol of the primary data in the second transmit signal based on the same secondary data while the values of the secondary data are recoverably preserved in the first and second transmit signals.

2. The method of claim 1 wherein the first transmitting step and the second transmitting step have time diversity.

3. The method of claim 1 wherein the first transmitting step and the second transmitting step have spatial diversity.

4. The method of claim 1 wherein the first transmitting step and the second transmitting step have frequency diversity.

5. The method of claim 1 further comprising the step of receiving the first and second signals with a terrestrial repeater and re-broadcasting the first and second signals with the original diversity.

6. The method of claim 1 wherein the secondary data uses a different forward error correction technique than the primary data.

7. The method of claim 1 wherein the primary data is for a legacy system.

8. The method of claim 1 wherein the primary data is modulated on the carrier in a QPSK modulation and the secondary data is hierarchically modulated on the carrier wave by providing at least a phase offset in the QPSK modulation, with the polarity provided to the secondary data determining the phase offset direction.

9. The method of claim 8 wherein the hierarchical modulation of the secondary data is hierarchically modulated on the carrier wave entirely by the phase offset in the QPSK modulation.

10. The method of claim 1 wherein the first transmit signal is transmitted from a first communication satellite and the second transmit signal is transmitted from a second communication satellite.

11. The method of claim 10 wherein the primary data is modulated on the carrier in a QPSK modulation and the secondary data is hierarchically modulated on the carrier wave by providing at least a phase offset in the QPSK modulation, with the polarity provided to the secondary data determining the phase offset direction.

12. The method of claim 10 wherein the hierarchical modulation of the secondary data is hierarchically modulated on the carrier wave entirely by the phase offset in the QPSK modulation.

13. The method of claim 10 wherein the first transmitting step and the second transmitting step have time diversity.

14. The method of claim 10 wherein the first transmitting step and the second transmitting step have frequency diversity.

15. The method of claim 10 further comprising the step of receiving the first and second signals with a terrestrial repeater and re-broadcasting the first and second signals with the original diversity.

16. The method of claim 1 wherein the primary data is phase modulated on the carrier and the modification of the primary data by the secondary data in hierarchical modulation comprises at least a phase offset thereto, with the polarity provided to the secondary data determining the phase offset direction.

17. The method of claim 16 wherein the modification of the primary data by the secondary data in hierarchical modulation is entirely a phase offset thereto.

* * * * *